Figure 1:
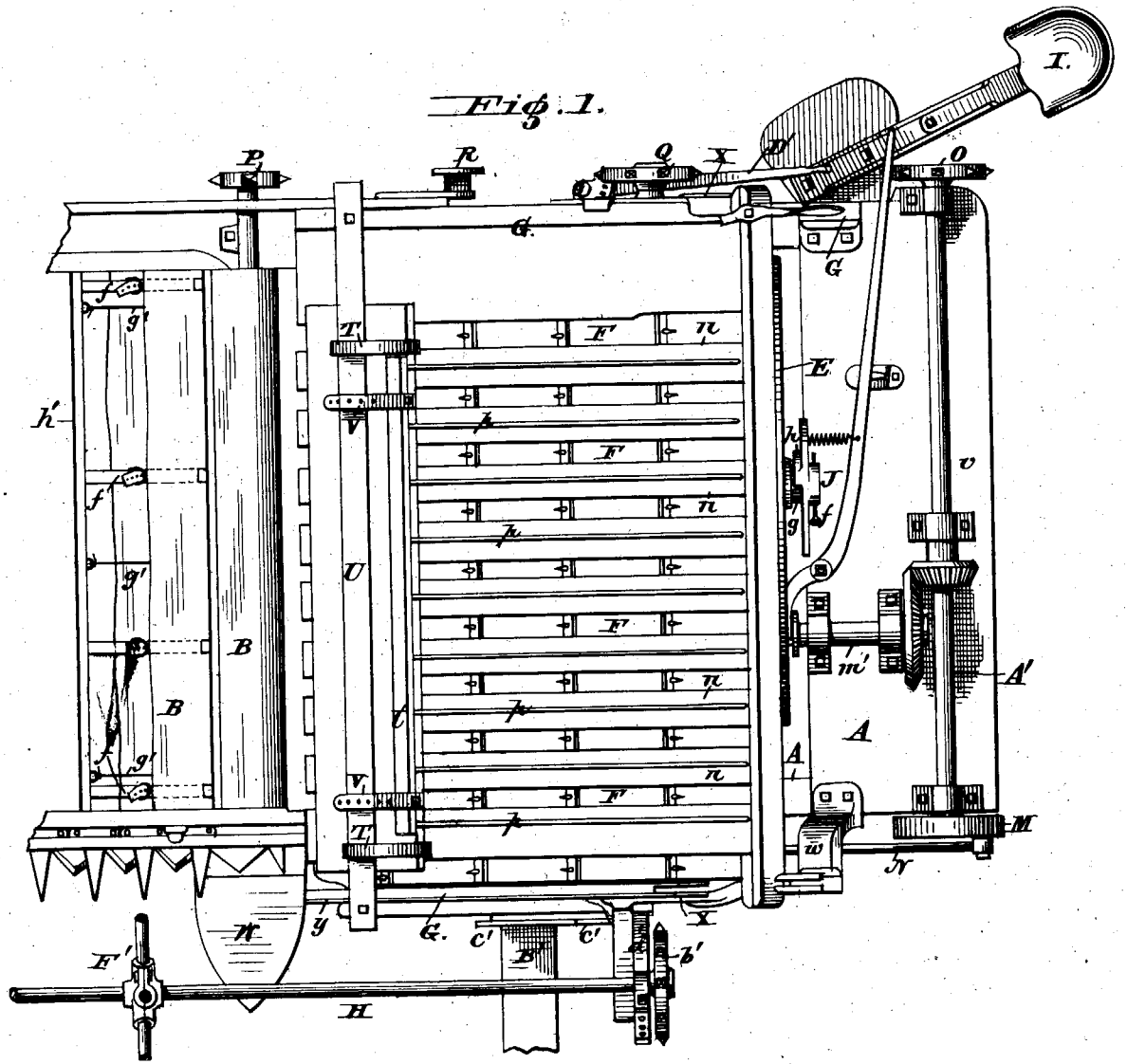

S. D. LOCKE.

Harvesting Machine.

No. 9,718. Reissued May 24, 1881.

Attest:
H. L. Pennie
Daniel Kelly.

Inventor.
Sylvanus D. Locke
By Pancoast & Pancoast
Attorneys

S. D. LOCKE.
Harvesting Machine.
No. 9,718. Reissued May 24, 1881.
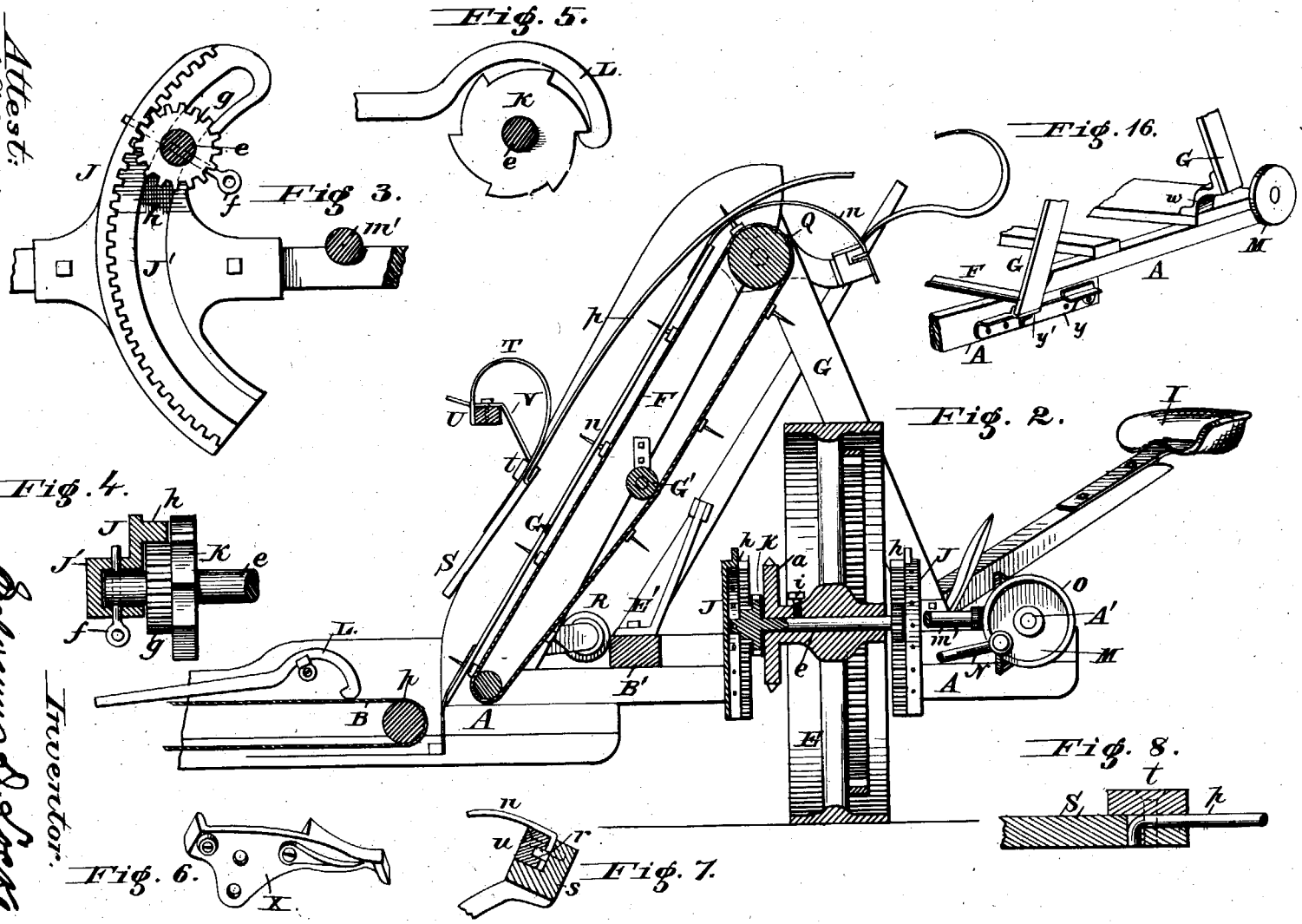
Attest:
H. L. Pennie
Daniel Kelly.
Inventor.
Solomon D. Locke
By Pancoast & Pancoast
Attorneys.

S. D. LOCKE.
Harvesting Machine.
No. 9,718. Reissued May 24, 1881.
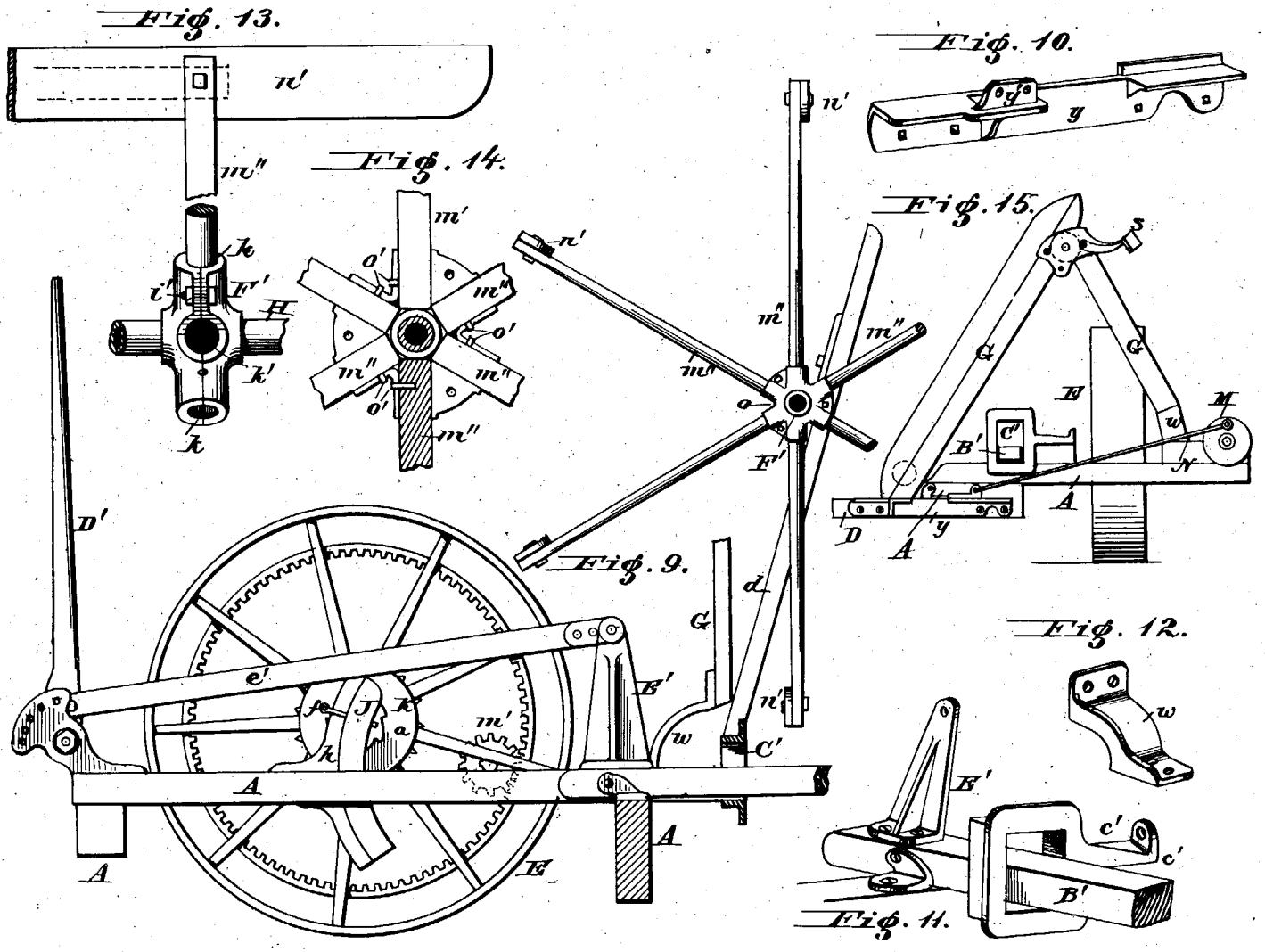
Attest:
H. L. Pennie
Daniel Kelly.
Inventor.
Sylvanus D. Locke
By Pancoast & Pancoast
Attorneys

UNITED STATES PATENT OFFICE.

SYLVANUS D. LOCKE, OF HOOSICK FALLS, NEW YORK.

HARVESTING-MACHINE.

SPECIFICATION forming part of Reissued Letters Patent No. 9,718, dated May 24, 1881.

Original No. 156,804, dated November 10, 1874. Application for reissue filed March 19, 1881.

*To all whom it may concern:*

Be it known that I, SYLVANUS D. LOCKE, of Hoosick Falls, in the county of Rensselaer and State of New York, have invented certain new and useful Improvements in Harvesters; and I do hereby declare the following to be a full, clear, and exact description of the same, reference being had to the accompanying drawings, in which—

Figure 1 is a plan view of my machine. Fig. 2 is a vertical longitudinal section of the same. Fig. 3 is an inner-side elevation of one of the main wheel sector-plates. Fig. 4 is a cross-section of said sector-plate. Fig. 5 represents the shifting-ratchet on the main axle. Fig. 6 is a perspective view of one of the tie-plates for the elevator-frame. Figs. 7 and 8 are cross-sections, showing the manner of securing the ends of the guard wires and strips. Fig. 9 is an inner-side elevation of the main wheel, frame, and device for controlling the tongue. Fig. 10 is a perspective view of the bracket guide-plate at the inner end of the cutting apparatus. Fig. 11 is a perspective view of the rear end of the tongue and its yoke. Fig. 12 is a perspective of one of the elevator-frame brackets. Fig. 13 is an elevation of the reel-hub and beater. Fig. 14 is a side view of one of the parts of the reel-hub. Fig. 15 is a front elevation, showing the front of the elevator-frame and its connection to the main frame; and Fig. 16 is a perspective, showing the feet of the bars of the front of said frame and their connection to the main frame.

This invention relates to improvements in that class of harvesters wherein the cut grain is received upon endless aprons or belts, and thereby conveyed to the side of the machine and delivered either upon the ground in unbound gavels or into a binder's receptacle; and it consists, first, in the method of supporting the front side of the elevator-frame so that the same shall be in advance of the points of the cutters and allow free space for the location and movement of the pitman; second, in the method of constructing the elevator-frame; third, in a bracket-plate constructed to form in one piece a guideway for the heel of the cutter-bar and a ledge to support the foot of the forward bar of the elevator-frame; fourth, in the method of raising or lowering the main axle as respects the frame; fifth, in the method of securing the ends of the guide-slats over which the grain is moved while being elevated; lastly, in various combinations and details of construction, hereinafter described and claimed.

That others may fully understand my invention, I will more particularly describe it.

A is the main frame of the machine, constructed in form and manner similar to the frames of other machines of the same class. This frame is supported at its inner end by a main carrying-wheel, E, and at its outer end by a grain-wheel.

The cutters D and guard-fingers are arranged along the front edge of the main frame, as shown, and are located near the plane of the bottom thereof, so as to enable the grain to be cut very near to its roots.

The endless apron B receives the grain as it is severed by the cutters, and conveys it to the side of the machine, where it is delivered to the elevating-apron F, and thereby carried above the main wheel E and delivered into a receptacle convenient for binding either automatically or by hand. This elevating-apron F is mounted upon two rollers, one journaled on the main frame and inner front strut of the elevator-frame G, and the other at the apex of said elevator-frame, which is supported on the main frame above the wheel E so as to bridge the latter.

The reel-shaft H, made of tubular metal, (gas-pipe serving a good purpose therefor,) is supported in adjustable bearings upon the reel-posts at the inner and outer ends of the main frame, and said reel is driven by a chain working over sprocket-wheels *a b*, one of which is upon the hub of the main wheel E, and the other upon the reel-shaft.

The seat I for the driver is mounted upon the main frame in a position where his weight may most effectually balance the machine.

The main wheel E is mounted loosely upon an axle, *e*, which is adjustable up or down in grooved segment-standards J, and held in its adjusted position by pins *f* passing through each segment and the end of the axle resting therein, though other means well known to mechanics may be employed for this purpose. In order to effect an easy adjustment, I place upon each end of the axle a pinion, *g*, and arrange the same to mesh with a rack, *h*, placed upon the segment-standard J, so that if said axle is rotated said pinions will travel along said racks, and the axle will move up or down, as the case may be, and the relative positions of the main wheel and main frame will be thereby correspondingly changed. The extreme end of the axle, beyond the pinion, enters an elongated casing, J′, on the outer face of the segment-standard, curved to follow the contour of the rack, and of such diameter as to sit closely on opposite sides of the periphery of said end, so as to steady it against transverse play and relieve the pinion of undue strain. The serial holes for the locking-pins *f* are made through this casing.

Upon the axle, between the drive-wheel and one of the pinions, and clear from the segment-standard, I fix a wheel, *k*, of sufficient size to give considerable leverage, and toothed on its periphery to afford a purchase. By means of a suitable wrench, L, which may be carried on the machine, as shown in Fig. 2, this wheel can be turned, the pins *f* having first been withdrawn from the ends of the axle to rotate the axle and its pinions, and thereby effect the desired adjustment up or down, after which the pins will be reinserted to hold the axle in its adjusted position. Instead of adjusting by this means, however, the set-screw *i* may be employed to lock the wheel E fast to the axle *e*, when the forward or backward motion of the machine itself will cause the required revolution and change of adjustment of the axle *e*.

Machines of this class have heretofore usually been constructed with cutters operated by a long lever extending backward from near the center thereof through the main frame, said lever being operated by a crank-shaft upon the inner side of the main wheel.

In the machine heretofore patented to me, August 30th, 1870, a crank-shaft is employed, located upon the outer side of the driving-wheel and operating a pitman in line with the cutters.

In the machine herein described the crank-shaft A′ is mounted in bearings upon the cross-bar *v* at the end of the main frame, and is driven by a counter-shaft, *m′*, which is actuated by a cog-rim upon the main wheel E. At the forward end of said shaft A′ there is a crank-wheel, M, to drive the pitman N and cutters D, and on the rear end of said shaft there is a sprocket-wheel, O, to actuate a chain, by means of which the sprocket-wheels P Q at the ends of the driving-rollers for aprons B and F are both driven. The adjustable guide-roller R serves to conduct said chain properly upon the sprocket-wheels, and also to take up the slack thereof, so as to insure its proper working. Said chain is constructed in some well-known way adapted for use upon a sprocket-wheel. It passes from drive-wheel O directly to wheel P, and thence under roller R to wheel Q, and downward again to the drive-wheel.

The apron F is provided with transverse cleats studded with projecting tines or fingers, to seize the cut grain and forcibly carry it up over the wheel E. The grain does not come in contact with said belt F, but is caused to slide over guide-slats *n*, between which said fingers protrude; and to prevent its displacement by the wind or other causes guard-wires *p* are secured to a floating guard-board, S, and extend upward therefrom over the top of the elevator-frame and insure the delivery of the grain. The slats *n* are generally made of wood and tipped at each end with metal. The ends of said metallic tips I bend at right angles and place in a rabbet made in the bar *s* at the top of the elevator-frame G, with a steady pin, *r*, projecting through a suitable orifice in each tip. A wooden strip, *u*, is then placed in said rabbet and fastened there by screws beneath the plane of the slats, thereby confining all of said tips, while leaving the surface over which the grain passes unobstructed. The lower ends of said guide-strips are secured to the floor of the main frame in a similar way, except that no rabbet is required, the pins being set directly in said floor. The guard-wires *p* have their ends also bent at right angles and placed in holes made in the floating guard-board S, while grooves extending from said holes to the edge of said board receive a portion of the guard-wire itself, as shown in Fig. 8. A strip, *t*, is then placed along the edge of the board S, covering all of said grooves and holes, and with a very few screws securing all of said floating wires at one operation. The floating guard-board S is attached by springs T to a stationary bar, U, by means of which it is not only controlled, but is pressed down upon the grain which the apron F is elevating, and its limit of approach to the guide-slats *n* (to adapt it to the quantity of grain passing over said slats) is regulated by adjusting-straps V, which extend from said board to the stationary bar.

The elevator-frame G is constructed with bars of suitable dimensions, joined at their tops, their bottoms asunder and supported upon metallic brackets secured to the main frame.

At the front of the machine it is required that the edge of the elevating-apron F shall be in advance of the front edge of the horizontal apron B, because the butts of the cut-grain, as it falls upon the apron B, will project over the front edge of the same, and the elevating-apron must project equally or the butts will be liable to entanglement. I therefore mount the front part of the elevator-frame upon projecting brackets *w y*, these latter being shown in Figs. 10 and 12, cast in one piece with a guideway for the heel of the cutter-bar and pitman-joint, and a ledge to support the inner divider, W.

The guide for the heel of the cutter-bar and pitman-joint has heretofore been made close to the end of the cutter and as a part of the inner shoe or divider; but the lower roller of the elevator-apron, if advanced so far as the points of the cutters, interferes with the operation of a straight pitman moving in line with said cutter-bar. I therefore elongate the cutter-bar and make the guideway for its heel and the pitman-joint in the bracket-plate *y* at a distance from the inner cutter-blade sufficient to permit the presence of the said lower roller between the said pitman-joint and the inner shoe or divider, whereby the front edge of the elevating-apron may be advanced as far as the points of the cutters without impeding the operation of the straight pitman and cutters reciprocating in the same vertical plane.

The elevator-frame is also supported in advance of the cutter-bar upon brackets which leave free space for the location and operation of the pitman. The inclined bars or struts of the frame are secured together at the top by tie-plates X, (shown in perspective in Fig. 6.) Said tie-plates serve not only to unite the tops of the frame-bars, but also form bearings for the upper roller of the elevating-apron F, and by their projection beyond the elevator frame they support also the bar *s*, to which the upper ends of the guard-slats *n* are secured.

The elevation of the cutters is controlled by a flexible tongue, B′, jointed to the main frame beneath the elevator and adjustable at the will of the driver. The tongue B′ passes through an elongated yoke, C′, secured to the front of the main frame to prevent any lateral movement of said tongue, but to permit it to move up and down freely. Said yoke is made of metal, and it is secured to said frame by a bracket, *c*′, which also serves as a point or place of attachment for the foot of the reel-post *d*′. The tongue is controlled by a lever, D′, located so as to be convenient to the hand of the driver, and provided with a locking device, said lever being connected by a rod, *e*′, with the arm E′, which is rigidly secured to the rear end of the tongue. In the present instance the lever is at the rear of the elevator-frame, and the rod or link passes longitudinally therebeneath to its connection with the tongue.

The ends of the apron B are joined by means of straps *f*′ in the usual manner; but they do not alone bring the edges together in a desirable manner, for the reason that said straps cannot at both sides be stitched close to the end of the belt, else after the same had been in use for a time, and had become stretched, it would prevent the tightening of the straps. I therefore attach cords *g*′ to the free ends of the said apron, and secure the same to staples set in the cleat *h*′ nearest the opposite end of the apron, and in that way I am enabled to keep the ends of the apron snug and tight, and effectually to prevent the entrance of the straw and grain to the space between the two parts of the apron.

The reel-hub F′ is made in two parts, one of which is secured rigidly to the shaft H. Said parts are counterparts of each other, and are secured together by bolts *i*′. The said parts are constructed to form sockets *k*′ for the reception of the arms *m*″ of the reel-beaters *n*′. A steady-pin, *o*′, is inserted in each of said reel-arms, and said pins rest in notches made in the hub F′ for that purpose, so that said arms are securely retained in place, even though the bolts *i*′ may not clamp them very firmly. I construct the reel-beaters *n*′ and their arms *m*″ with a joint connecting them, so that when the machine is to be stored or transported, as soon as released from hub F′ said arms may be folded by the side of the beaters, and not only thereby reduced to a very small space, but when not in use rendered very much less liable to injury.

An adjustable tightening-roller, G′, may be attached to the elevator-frame, inside of the elevating-apron, to take up the slack of the same.

Having described my invention, what I claim as new is—

1. The combination of the axle, pinions upon each end of the axle, standards in which the axle moves, racks upon said standards, with which the pinions engage, and pins passing through the standards and axle beyond the pinions to lock the axle in position.

2. The combination of the axle, pinions upon each end of the axle, standards in which the axle moves, racks upon said standards, with which the pinions engage, and casings on the outer face of the standards, into which the ends of the axle take, and whereby they are steadied against transverse play.

3. The combination of the axle, pinions upon each end of the axle, standards in which the axle moves, racks upon said standards, with which the pinions engage, casings on the outer face of the standards, into which the ends of the axle take, and whereby they are steadied against transverse play, and pins passing through said casing and the ends of the axle to lock it in position.

4. The combination of the axle, pinions on each end of the axle, standards in which the axle moves, racks upon said standards, with which the pinions engage, an independent wheel fast on the axle, whereby the axle and pinions may be rotated to change the adjustment of the axle, and means for holding the axle in its adjusted position.

5. The combination of the axle, pinions upon each end of the axle, standards in which the axle moves, racks upon said standards, with which the pinions engage, an independent wheel fast upon the axle between the main wheel and pinions, whereby the axle and pinions may be rotated to change the adjustment, and means for holding the axle in its adjusted position.

6. The combination of the main frame bearing the cutters, the main wheel and its axle, pinions on each end of the axle, standards on the main frame, in which the axle moves, racks upon said standards, with which the pinions engage, a wheel fast on the axle, whereby the axle and pinions may be rotated to change the adjustment of the frame relative to the main wheel, and means for holding the frame in its adjusted position.

7. The combination of the main wheel E, the axle *e*, pinions *g*, fast wheel *k*, and the standards J, having racks *h*, substantially as described.

8. The segment-standards J, formed, as described, with racks *h* to mesh with pinions upon the axle, and with outside casings, J′, of the relative diameter set forth, to receive and steady the ends of said axle.

9. The combination, in a harvester, of an endless transverse receiving-apron, a reciprocating cutting apparatus in the plane of the lower part of said apron, a pitman in line with said cutting apparatus, and an elevating-apron, the front edge of which is advanced in line with the points of the cutters.

10. The combination, with the endless raking-apron, of the adjusting-straps *f* and the cords attached to the free end of said apron and supplementing the straps, substantially as described.

11. The bracket X, constructed as described, connecting the upper end of the frame G G and supporting the bar *s*, substantially as described.

12. The bracket *w* and ledge *y′*, supporting the front side of the elevator-frame G G, said bracket attached to main frame and ledge to finger-beam, substantially as and for the purpose described.

13. The bracket *w*, attached to the main frame, for supporting the elevator-frame, constructed as described, so as to allow free space for the location and movement of the pitman.

14. The elevator-frame composed of bars G G, combined with bracket *w* and ledge *y*, constructed as described, and the tie-plate bracket X, formed to support the journal of the upper apron-roll and the bar *s*, as set forth.

15. In combination with the finger-beam, the cast bracket-plate *y*, constructed to form in one piece a guideway for the heel of the cutter-bar and ledge for the attachment of the foot of the forward bar, G, of the elevator-frame.

16. The main axle *e*, having secured thereto the pinions *g g*, and the racks *h h*, secured to the main frame, combined with the set-screw *i*, or its equivalent, to lock the axle to the wheel for the purpose of raising or lowering the frame as the main wheel is turned.

17. The guide-slats *n*, bent at their ends, as described, and secured by means of the steady-pins *r* and binding-strip *u*, in the manner set forth.

SYLVANUS D. LOCKE.

Witnesses:
JOSEPH G. PARKINSON,
JOHN W. CORSON.